H. C. LÜDERS.
Elliptic Spring.

No. 213,218. Patented Mar. 11, 1879.

Witnesses
William J. Cooper.
Harry Smith.

Inventor
Harrison C. Lüders
by his Attorneys
Howson & Son

UNITED STATES PATENT OFFICE.

HARRISON C. LÜDERS, OF PHILADELPHIA, PENNSYLVANIA.

IMPROVEMENT IN ELLIPTIC SPRINGS.

Specification forming part of Letters Patent No. 213,218, dated March 11, 1879; application filed February 6, 1879.

*To all whom it may concern:*

Be it known that I, HARRISON C. LÜDERS, of Philadelphia, Pennsylvania, have invented a new and useful Improvement in Elliptic Springs, of which the following is a specification:

My invention relates especially to an improvement in that class of elliptical springs which consist of a number of layers of metal, and which, when applied to vehicles, are polished, painted, electroplated, or provided with other coatings, to prevent the oxidation of the metal, and to impart to the spring a neat appearance.

Figure 1:
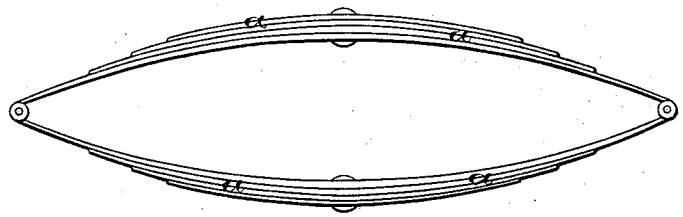

The usual manner of constructing such a spring is shown in Figure 1, on reference to which it will be observed that each half of the spring is composed of a series of layers or leaves, $a$, firmly bolted together in the middle, the leaves varying in length, and each leaf being in intimate contact throughout its whole length with the leaf upon which it rests.

When such a spring is compressed the opposite ends of the leaves are caused to move, or, as it is technically termed, to "creep," on each other, the effect of such movement being that each leaf, at and near the ends of the overlying leaf, is abraded, the protecting coating removed, and the metal exposed to the oxidizing effect of the atmosphere, which not only injuriously affects the spring, but detracts from its neat appearance.

Figure 2:
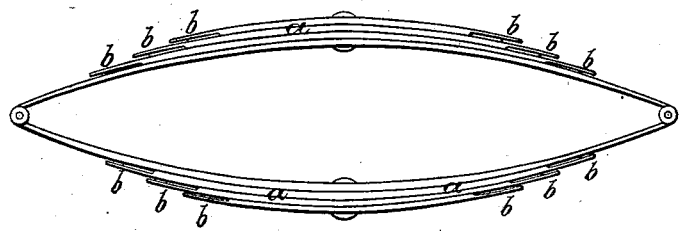
Figure 3:

These objections I overcome by reducing the thickness of each leaf $a$ at and near each end, as shown in Fig. 2, and more distinctly in the enlarged view, Fig. 3, so that although the leaves are in close contact with each other throughout much the greater portion of them, each leaf is, at and near its end, free from contact with the adjoining leaf. Although this does not prevent the scratching or rubbing of the leaves when the spring is compressed and recoils, such scratched or rubbed portions are concealed from view and shielded by the overhanging ends $b$ of the leaves, so that the appearance of the spring is not marred and the tendency of the rubbed portions to become oxidized in a measure obviated.

I am aware that elliptic springs have been made or contemplated in which the leaves were separated from each other throughout their entire length by rubber blocks or filling-pieces. I therefore do not claim, broadly, elliptical springs the leaves of which are separated from each other; but

I claim as my invention—

An elliptical spring the leaves $a$ of which are in contact with each other throughout the greater portion of their length, but have overhanging ends $b$, for concealing and protecting those portions of the spring which are abraded by the creeping of the leaves on each other when the spring is compressed and recoils, all substantially as specified.

In testimony whereof I have signed my name to this specification in the presence of two subscribing witnesses.

HARRISON C. LÜDERS.

Witnesses:
WM. J. COOPER,
HARRY SMITH.